Figure 1:
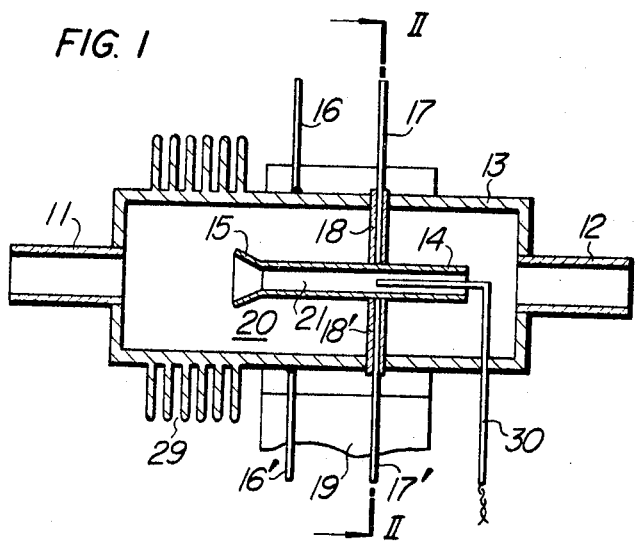

United States Patent
Goto

[15] 3,672,206
[45] June 27, 1972

[54] OXYGEN DENSITOMETER FOR LIQUID METALS

[72] Inventor: Tadashi Goto, Hitachi-shi, Japan

[73] Assignee: Hitachi, Ltd., Tokyo, Japan

[22] Filed: July 17, 1969

[21] Appl. No.: 842,642

[30] Foreign Application Priority Data

July 24, 1968   Japan....................................43/51863

[52] U.S. Cl. .................................................73/61, 73/17 R
[51] Int. Cl. .........................................................G01n 27/08
[58] Field of Search ....................................................73/61, 17

[56] References Cited

UNITED STATES PATENTS

| | | | |
|---|---|---|---|
| 2,782,369 | 2/1957 | Werner et al. | 73/17 UX |
| 2,997,874 | 8/1961 | Billuris et al. | 73/61 |
| 3,002,820 | 10/1961 | Hall et al. | 73/61 UX |
| 3,340,725 | 9/1967 | Wikinson | 73/61 |
| 3,343,401 | 9/1967 | Delisle | 73/61 X |
| 3,462,997 | 8/1969 | Roach et al. | 73/61 |
| 3,481,181 | 12/1969 | Roach | 73/61 |

Primary Examiner—Louis R. Prince
Assistant Examiner—Joseph W. Roskos
Attorney—Craig, Antonelli, Stewart & Hill

[57] ABSTRACT

An oxygen densitometer for liquid metals employs a pair of separated passageways, each having different cross sectional areas, each passageway being located immediately adjacent with the other end and receiving a common stream of liquid metal. A pair of electrodes are disposed on each passageway so that the liquid flow on the passageway may be measured to provide an indication of the differential flow resistance between the two passageways caused by an oxides which may exist within the liquid metal. Preferably, the passageways include concentrically disposed tubes and the electrodes attached thereto provide a signal representing flow resistance differential and a thermometer attached thereto provides a signal representing the temperature of the liquid metal.

7 Claims, 8 Drawing Figures

INVENTOR

TADASHI GOTO

INVENTOR

TADASHI GOTO

BY Craig, Antonelli, Stewart & Hill

ATTORNEYS

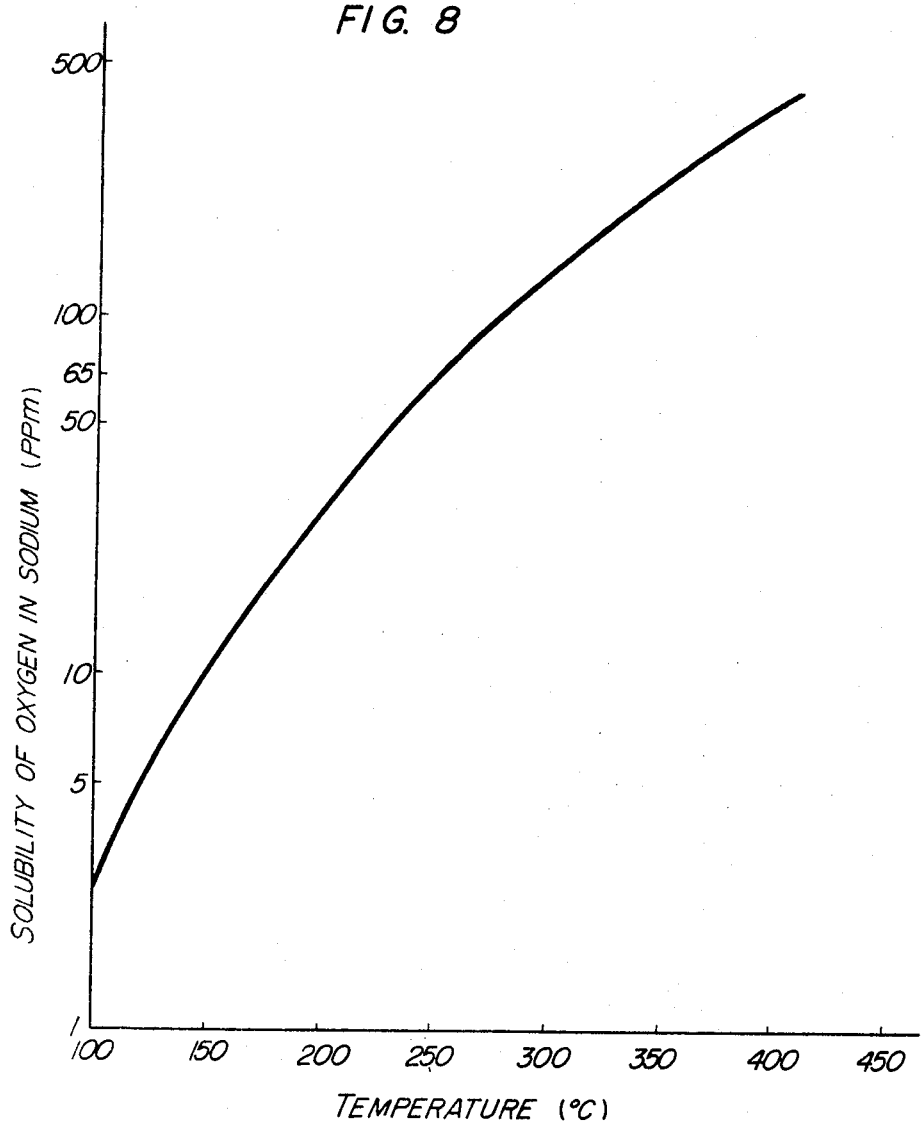

OXYGEN DENSITOMETER FOR LIQUID METALS

The present invention relates to an equipment for measuring the concentration of oxides (sodium oxide, etc.) contained in a liquid metal, particularly in a sodium-potassium base liquid metal (hereinafter the invention will be described with reference to sodium).

As the concentration of oxides in a molten sodium increases, an undesirable phenomenone will result, such as corrosion of a container structure and tubings thereof in contact with said molten sodium or clogging of a conduit. Particularly, in a liquid-metal cooling type nuclear reactor the oxides cause various equipment of the reactor to be corroded and thereby occasionally renders the reactor inoperable. By this reason, it has been customary to refine the sodium by removing the oxides therefrom upon measuring the oxygen concentration in said molten sodium.

As an oxygen densitometer for sodium, a clogging indicator has been used. This indicator has widely been used in sodium circuits because of its high reliability and easy maintenance. However, the clogging indicator is capable of measuring the oxygen concentration in a molten sodium, only after a small diameter conduit for the molten sodium has been clogged with an oxide deposit formed in said conduit upon cooling said molten sodium, said oxide deposit being re-molten by heating it after measurement, whereby a flow of molten sodium is restored in said conduit. Therefore, when the clogging indicator is used with such a practical apparatus as nuclear reactor in particular, not only is it difficult to continuously measure the quantity of oxides in a coolant which flows successively through the center of the reactor, but also the measuring operation is complicate.

The present invention has been achieved in view of the foregoing. Namely, an object of the present invention is to provide an oxygen densitometer for liquid metals adapted for use with such a practical apparatus as nuclear reactor, which is capable of continuous measurement.

Another object of the invention is to provide an oxygen densitometer of the character described above, which is capable of measuring an oxygen concentration with improved accuracy.

A further object of the invention is to provide an oxygen densitometer of the character described above, which is simple in construction, easy to operate and capable of automatic operation.

In order to attain the objects set forth above, according to the present invention two conduits defining separate passageways of different cross-sectional areas are provided for passing a single flow of liquid sodium therethrough, and electrodes are connected to said respective conduits and also a magnetic field is formed surrounding said conduits, whereby a flow meter based upon the principle of the Fleming's Law is constructed. The molten sodium to be passed through the two separate passageways is cooled, so that the stream of molten sodium passing through each one of said passageways is subjected to a flow resistance created by the oxide precipitated in said molten sodium. This flow resistance is variable according to the quantity of the oxide precipitated and the area of the passageway. Therefore, by feeding a signal representing a flow resistance differential between the two passageways and a signal representing the temperature of the molten sodium at the time of measuring said flow resistances, into a circuit in which the relationship between the known flow resistance differential and the temperature has previously been memorized, the quantity of oxide present in the molten sodium can be known immediately.

Namely, according to the invention the quantity of oxide present in the molten sodium can be known by measuring the flow resistance differential between the two passageways. Therefore, there is no necessity of having the passageways clogged but the quantity of oxide in the molten sodium can be known while keeping said molten metal flowing, so that continuous measuring is possible.

Figure 2:
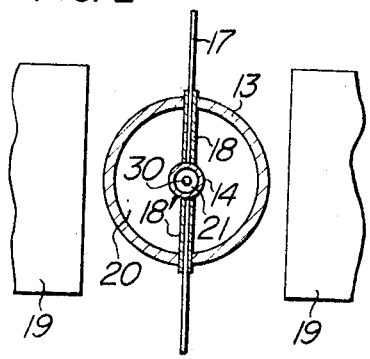
Figure 3:
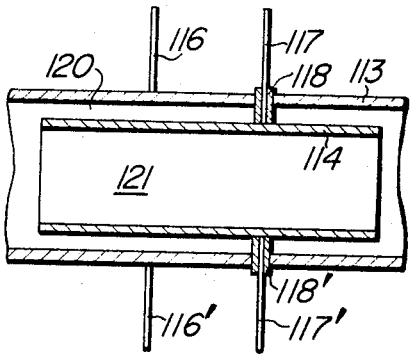
Figure 4:
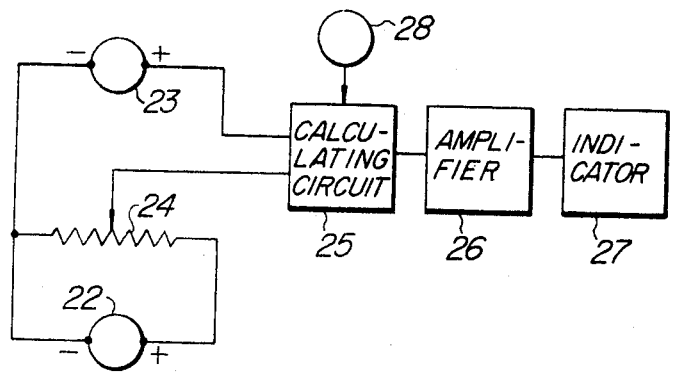
Figure 5:
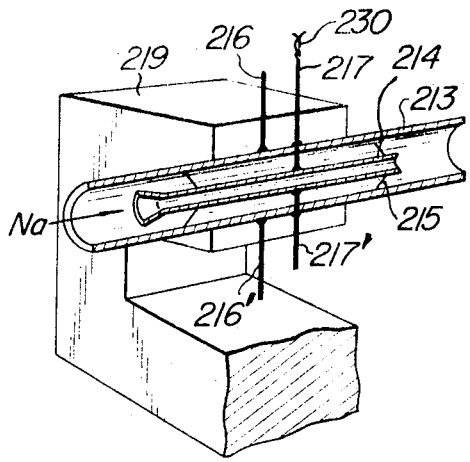
Figure 6:
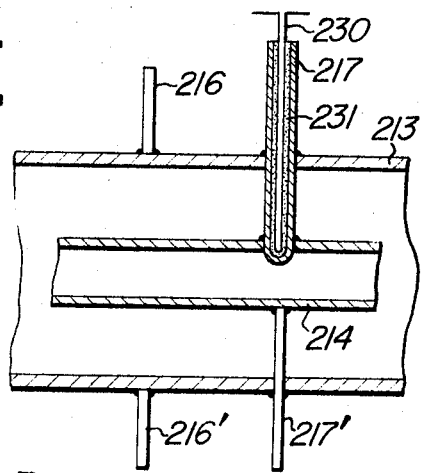
Figure 7:
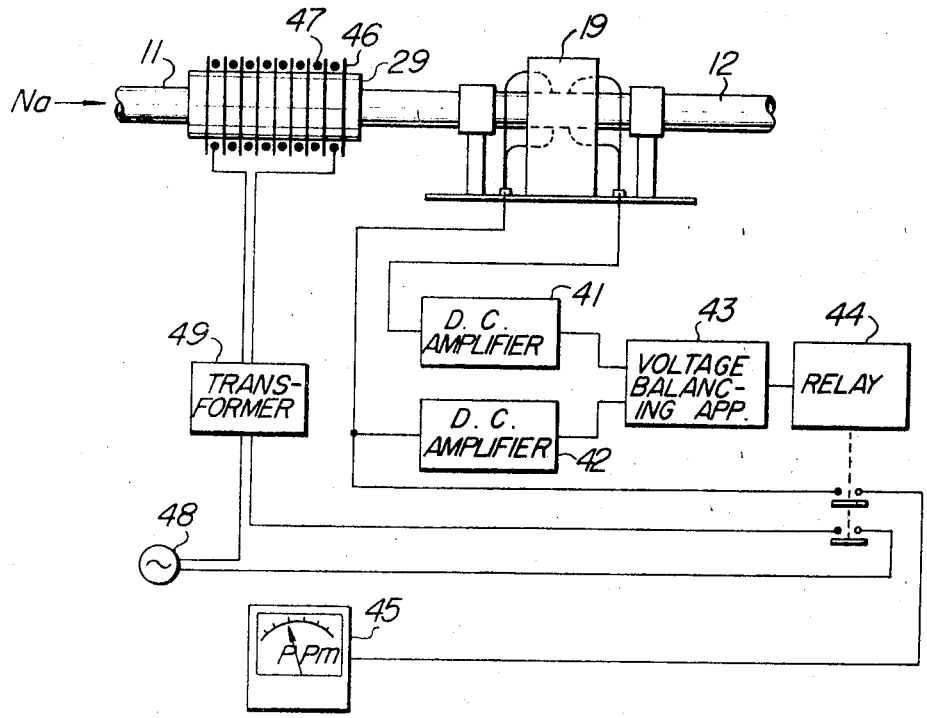

Further features of the invention will become apparent from the embodiments of the equipment according to the invention which are hereinafter described with reference to the accompanying drawings, in which:

FIG. 1 is an illustrative view showing diagrammatically an embodiment of the present invention;
FIG. 2 is a sectional view taken along the line I—I of FIG. 1;
FIG. 3 is an illustrative outline view showing another embodiment of the invention;
FIG. 4 is a diagrammatic view showing the fundamental measuring circuit according to the invention;
FIG. 5 is a fragmentary perspective view of the equipment shown in FIG. 1;
FIG. 6 is a detail view of a portion of FIG. 5;
FIG. 7 is a diagrammatic view showing a practical measuring circuit according to the invention; and
FIG. 8 is a diagram showing a saturation solubility curve of sodium.

With reference to FIGS. 1 and 2, an outer tube 13 is connected intermediate between pipes 11 and 12 which constitute a by-pass for sodium leading from a cooling system or the like of a nuclear reactor, and interior of said outer tube 13 is disposed an inner tube 14 having an outwardly expanding end 15.

Electrodes 16 and 16' are mounted on the outer tube 13 and electrodes 17 and 17' on the inner tube 14. That portions of the electrodes 17 and 17' which extend in the sodium passageway defined by the outer tube 13, are shielded with electrode protective sleeves 18 and 18' respectively. A magnet 19 is provided exterior of the outer tube 13 in perpendicular relation to the electrodes 16, 16' and 17, 17', so as to form a magnetic field. On the forward end portion of the outer tube 13, that is, the end portion located upstream of the inner tube 14, is provided cooling means 29 for cooling a molten sodium flowing from the pipe 11 into the outer tube 13.

Thus, it will be understood that a sodium passageway 21 is formed by the inner tube 14 and a separate sodium passageway 20 is formed between the outer tube 13 and the inner tube 14. The cross-sectional area of the passageway 20 is made larger than that of the passageway 21.

Between the electrodes 17 and 17' is provided a thermocouple 30. The mounting positions of the electrodes are not restricted to those shown.

In FIG. 3, there is shown another form of the oxygen densitometer according to the invention, wherein an inner tube 114 of large diameter is disposed in an outer tube 113, with the outer peripheral surface thereof located close to the inner peripheral surface of the latter, whereby passageways 120 and 121 are formed, the cross-sectional area of the former being considerably smaller than that of the latter. Such an arrangement is also effective for attaining the object of the invention.

FIG. 4 shows the fundamental measuring circuit according to the invention. An electromotive force E generated between the electrodes 16 and 16' is supplied to a voltmeter 22, while an electromotive force e generated between the electrodes 17 and 17' is supplied to a voltmeter 23. The voltmeters 22 and 23 are connected to a calculating circuit 25, memorizing a sodium saturation solubility curve therein, through a voltage balancing apparatus 24.

The calculating circuit 25 memorizing a sodium saturation solubility curve has a thermocouple output voltmeter 28 connected thereto, through which a signal representing a measured value of the thermocouple is transmitted to said calculating circuit. Thus, the calculating circuit 25 is supplied with a voltage differential between the voltmeters 22 and 23, and the signal representing a measured value of the thermocouple. In the calculating circuit, an oxygen concentration is calculated from these signals, based on the known relationship between the voltage differential and the sodium temperature which has previously been memorized in said circuit, and a signal representing such oxygen concentration is fed to an amplifier 26, wherein the signal is amplified to a voltage or a current required for recording or indication, to be sent to a recorder or indicator 27.

The sodium saturation solubility curve, referred to herein, is drawn by plotting the points at which the oxide precipitates in the molten sodium in relation between the oxygen solubility (p.p.m.) in said molten sodium and the sodium temperature (°C.), and takes a form as shown in FIG. 8.

The molten sodium from the pipe 11 passes through the separate passageways 20 and 21 (or 120 and 121) and voltage E and e in proportion to the flow quantities in said respective passageways are developed between the electrodes 16, 16' and 17, 17' (or 116, 116' and 117, 117'). These two voltages are previously balanced by the voltage balancing apparatus 24 under normal flow condition of the sodium. When the molten sodium is cooled by the cooling means 29, the molten sodium is saturated with sodium oxide and sodium oxide precipitates in said molten sodium. Therefore, the molten sodium flows through the separate passageways 20 and 21 (or 120 and 121) with the sodium oxide contained therein. In this case, a flow resistance appears larger in the passageway 21 (or 120) than in the passageway 20 (or 121), so that the flow rate in the former passageway decreases. A flow rate differential thus produced between the two passageways is transmitted to the voltage balancing apparatus 24 in the form of a voltage variation, whereby the balancing state of the balancing apparatus 24 is disrupted and an unbalanced voltage is created. At this time, a thermo-electromotive force generated in the thermocouple 30 is detected and supplied to the calculating circuit, in which the sodium saturation solubility curve has previously been memorized, to calculate the sodium oxide solubility for recording or indication. For instance, if the temperature of the molten sodium is 250° C. at a point when the unbalanced voltage is created upon cooling the molten sodium, the oxygen solubility in said molten sodium is about 65 p.p.m. as will be seen in FIG. 8.

As shown in FIG. 5, the inner tube 214 is secured to the outer tube 213 by radical supporting plates 215. When the inner diameter of the outer tube is 34 mm., the inner diameter of the inner tube may be 10 mm.

Although in the embodiment described above, both the inner tube 214 and the outer tube 213 are cylindrical in shape, the configuration of these tubes are not restricted only to the cylindrical shape as will be apparent from the following description:

The theoretical equation of electromagnetic flow meter is as follows:

$$E = K_1 \cdot K_2 \cdot K_3 \cdot B \cdot v \cdot d \times 10^{-5} (mv)$$

wherein
$E$: Flow electromotive force (mV)
$B$: Magnetic flux density (gauss)
$v$: Flow rate (m/sec)
$d$: Inner diameter of tube (cm)
$K_1, K_2, K_3$: Coefficients (constant)

From the above equation, it will be understood that the electromotive force becomes larger as the value of $d$ (the inner diameter of the tube) is larger, facilitating the measurement and enhancing the accuracy of the measurement result. Therefore, by forming the inner tube or the outer tube or both in an oval cross-sectional shape and fixing the electrodes at the opposite ends of their major diameter, the measurement can be accomplished with higher accuracy for the same flow rate.

The electrodes are fixed to the outer tube 213 and the inner tube 214 respectively by welding as shown in FIG. 6. The electrode 217 fixed to the inner tube 214 has a cavity 231 therein, through which a thermocouple 230 extends with the end extremities of the two elementary wires thereof fastly connected to the bottom of said cavity 231. The cavity 231 is filled with an insulating material, such as magnesia (MgO) or alumina ($Al_2O_3$) for insulation between the elementary wires of the thermocouple 231 and the electrode 217.

Next, the oxygen concentration measuring circuit according to the invention will be described in further detail hereunder with reference to FIG. 7. The electromotive forces generated across the respective pairs of electrodes are introduced into D.C. amplifiers 41 and 42, and an output voltage of said amplifiers is fed to a voltage balancing apparatus 43, whereby the two electromotive forces are balanced prior to measurement. When an unbalancing voltage is developed upon cooling the molten sodium, a relay 44 is actuated. The relay 44 is connected with an indicator 45 so that a thermoelectromotive force generated in the thermocouple 230 in the electrode 217 is indicated on said indicator. The indicator 45 is provided with a curved scale representing the relationship between the temperature and the solubility of oxygen in sodium.

The relay 44 is also connected with a heater 47 wound around cooling fins 46. Therefore, when the relay 44 is actuated, a voltage is supplied to the heater 47 to heat the molten sodium, at the same time when the thermoelectromotive force is measured on the indicator 45. In this case, it is to be understood that the temperature of the molten sodium is not immediately elevated during the process of measuring the oxygen concentration but is returned to the original level at the measuring portion, only after completion of the measurement, to provide for the next measurement, by reason of the heat capacity of said cooling fins. The heater 47 is connected to a power source 48 through a heat quantity adjusting transformer 49.

What is claimed is:

1. An oxygen densitometer for liquid metals, comprising two separate passageways of different cross-sectional areas joining with each other upstream and downstream thereof, means for cooling a liquid metal upstream of said passageways, means for measuring a flow resistance differential between said two passageways which is caused by the oxide of said metal precipitating in said liquid metal, means for measuring the temperature of said liquid metal and a circuit for calculating the quantity of the oxide in relation to the temperature of the liquid metal measured at the time of occurrence of said flow resistance differential.

2. An oxygen densitometer for liquid metals as defined in claim 1, in which an outer tube and an inner tube defining said two separate passageways respectively are oval in cross-sectional shape and electrodes are fixed on said outer and inner tubes at the opposite ends of the major diameters thereof.

3. An oxygen densitometer for liquid metals as defined in claim 1, in which said means for measuring a flow resistance differential consists of electrodes and said means for measuring the temperature of the liquid metal consists of a thermocouple extending into a cavity formed in one of said electrodes, said cavity being filled with an insulating material.

4. An oxygen densitometer for liquid metals as defined in claim 1, in which said two separate passageways are defined by an outer tube and an inner tube disposed in said outer tube and the cross-sectional area of the passageway formed between said outer and inner tubes is smaller than that of the passageway defined by said inner tube.

5. An oxygen densitometer for liquid metals, as defined in claim 3, in which said means for measuring a flow resistance differential consists of electrodes and said means for measuring the temperature of the liquid metal consists of a thermocouple extending into a cavity formed in one of said electrodes, said cavity being filled with an insulating material.

6. An oxygen densitometer for liquid metals according to claim 5, wherein said means for cooling a liquid metal upstream of said passageways comprises a plurality of cooling fins externally mounted on said outer tube.

7. An oxygen densitometer according to claim 6, wherein said calculating circuit comprises a pair of D.C. amplifiers connected to said respective electrodes, a voltage balancing circuit and a switching circuit connected in series to the outputs of said amplifiers, the outputs of said switching circuit providing connections from said electrodes to an indicator and further including a heating element disposed adjacent to said cooling means located upstream of said passageways and being selectively connected in series with an energizing power source, through the action of said switch, whereby upon the detection of an unbalance of the voltages applied to said voltage balance balancing circuit, said heating means is energized to control the temperature of said liquid metal.

* * * * *